US007437053B2

(12) United States Patent
Ishibashi

(10) Patent No.: US 7,437,053 B2

(45) Date of Patent: Oct. 14, 2008

(54) DIGITAL VIDEO RECORDER, METHOD OF DRIVING THE VIDEO RECORDER AND PROGRAM

(75) Inventor: Hiromichi Ishibashi, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 870 days.

(21) Appl. No.: 10/756,708

(22) Filed: Jan. 12, 2004

(65) Prior Publication Data

US 2004/0146274 A1 Jul. 29, 2004

(30) Foreign Application Priority Data

Jan. 15, 2003 (JP) ............................ 2003-007181

(51) Int. Cl.

*H04N 5/91* (2006.01)
*H04N 7/26* (2006.01)
*H04N 7/64* (2006.01)
*H04N 5/00* (2006.01)
*H04N 5/76* (2006.01)
*H04N 7/173* (2006.01)
*H04N 7/16* (2006.01)
*G06F 11/00* (2006.01)
*G06F 13/00* (2006.01)
*G11B 7/00* (2006.01)

(52) U.S. Cl. .......................... 386/46; 386/83; 386/112; 386/116; 386/125; 386/126; 348/231.3; 714/6; 714/7; 714/8; 714/E11.034; 725/55; 725/115; 725/145; 369/44.32; 369/53.12; 369/53.31; 369/53.35; 369/53.36

(58) Field of Classification Search .................. 386/46, 386/54, 55, 83, 112, 116, 117, 125, 126; 348/231.3; 358/538, 539; 369/47.19, 275.3, 369/44.26, 44.28, 44.29, 44.35, 53.28; 725/55, 725/92, 115, 145; 714/6, 7, 8, E11.034

See application file for complete search history.

(56) References Cited

U.S. PATENT DOCUMENTS 5,274,799 A * 12/1993 Brant et al. .................... 714/6

(Continued)

FOREIGN PATENT DOCUMENTS

EP 0 256 380 A1 2/1988

(Continued)

OTHER PUBLICATIONS

"Media Defect Management Technique Via Access Method For Personal Computer Hardfiles", *IBM Technical Disclosure Bulletin*, vol. 31, No. 1, pp. 151-157 (1988).

(Continued)

*Primary Examiner*—Thai Tran
*Assistant Examiner*—Syed Y Hasan
(74) *Attorney, Agent, or Firm*—Panitch Schwarze Belisario & Nadel LLP

(57) ABSTRACT

A digital video recorder writes data on a selected one of a first storage medium and a second storage medium. The recorder includes an abnormal state detector for detecting any abnormal event that possibly occurs while the recorder is writing the data on the first storage medium. If the abnormal state detector senses the abnormal event while the recorder is writing the data on the first storage medium, then the recorder stops writing the data on the first storage medium and starts writing the data, which should have been written on the first storage medium only, on the second storage medium instead.

19 Claims, 6 Drawing Sheets

U.S. PATENT DOCUMENTS 5,574,506 A * 11/1996 Rhodes .................... 348/459
5,703,848 A * 12/1997 Hofer .................... 369/44.29
5,734,634 A * 3/1998 Ono et al. ................ 369/44.28
5,996,023 A * 11/1999 Winter et al. ............. 709/253
6,182,240 B1 1/2001 Mine
RE37,342 E * 8/2001 Washino et al. ............ 348/722
6,311,011 B1 * 10/2001 Kuroda .................... 386/46
6,327,674 B1 * 12/2001 Ito et al. ................. 714/8
6,609,175 B1 8/2003 Ando et al.
6,662,309 B2 * 12/2003 Ando et al. ............... 714/8
6,788,882 B1 * 9/2004 Geer et al. ............... 386/116
7,046,596 B2 * 5/2006 Schep et al. .............. 369/47.19
2002/0114229 A1 * 8/2002 Nishi .................... 369/44.23

FOREIGN PATENT DOCUMENTS

EP 1 102 248 A1 5/2001
EP 1 199 719 A2 4/2002
EP 1 211 688 A2 6/2002
JP 09-154105 A 6/1997
JP 10-143980 A 5/1998
JP 11-288577 A 10/1999
JP 2001-143373 A 5/2001
JP 2001-155474 A 6/2001
JP 2002-033997 A 1/2002
JP 3090135 U 9/2002

OTHER PUBLICATIONS

Notice of Reasons for Rejection for the counterpart Japanese Patent Application No. 2004-002618; Mailed May 27, 2008; 8 pages (including English translation).

* cited by examiner

TV TUNER
ENCODER
ENCODER
BUFFER MEMORY
DUMMY DATA GENERATOR
FIXED STORAGE DEVICE
MODULATOR
MICRO-PROCESSOR
PROGRAM MEMORY
TRACKING CONTROLLER
ABNORMALITY DETECTOR
CA·$\overline{VA}$
CA
VA
TE
RF
1
2
4
5
6
7
8
9
10
11
12
13
31
32
33

CAMCORDER IMAGING UNIT
120
ENCODER
31
ENCODER
33
BUFFER MEMORY
32
DUMMY DATA GENERATOR
6
4
FIXED STORAGE DEVICE
5
7
CA·$\overline{VA}$
CA
MODULATOR
8
MICRO-PROCESSOR
11
PROGRAM MEMORY
12
1
TRACKING CONTROLLER
13
TE
9
VA
ACCELERATION SENSOR
100

DIGITAL VIDEO RECORDER, METHOD OF DRIVING THE VIDEO RECORDER AND PROGRAM

BACKGROUND OF THE INVENTION

1. Field of the Invention

The present invention relates to a digital video recorder which can write the audiovisual data (e.g., moving pictures, audio data and so on) of a TV broadcast program on a storage medium in real time. As used herein, the "digital video recorder" is not limited to a fixed digital video recorder for use to write broadcast data but may broadly refer to a camcorder, a personal digital assistant or any other mobile electronic appliance.

2. Description of the Related Art

Digital video recorders for writing digital data on storage media such as an optical disc and/or a hard disk have been rapidly popularized recently. Among other things, a hybrid digital video recorder that comprises both an optical disc drive and a hard disk drive (HDD) attracts particularly much attention in the market. Such a hybrid digital video recorder allows the user to write the data to be saved on a hard disk first and then transfer that data from the hard disk to an optical disc, for example. In such a digital video recorder, the hard disk is fixed to the recorder and cannot be removed, but the optical disc can be easily removed. Accordingly, if an arbitrarily selected one of multiple optical discs prepared is loaded into this digital video recorder, then the data on the hard disk can be transferred to the optical disc and saved outside of the digital video recorder any time. Consequently, by using such a hybrid digital video recorder, various types of data (including moving pictures, still pictures and audio data) can be written and stored on the hard disk and/or optical discs.

Most of the optical disc drives included in those digital video recorders has a defect correction function to protect the data to be saved. In the digital video recorders disclosed in Japanese Laid-Open Publications Nos. 2000-100078 and 2000-112672, for example, an alternate area is provided in advance on an optical disc. If the optical disc has any defect, then no data will be written on the defective area and its surrounding areas. Instead, the data to be written there is written on the alternate area. The defect on the optical disc is typically dust or scratch on the disc surface.

By making such a defect correction, nothing will be missing from the information stored due to those defects, and therefore, information can be recorded and saved with high reliability.

Also, when broadcast data should be stored on an optical disc with a hybrid digital video recorder, the data is sometimes temporarily written on a hard disk included in the recorder before being written on the optical disc finally. That is to say, the broadcast data that has been once written on the hard disk is read out thereafter and then written on the optical disc. According to such a writing method, the hard disk is used as a sort of cache memory before the write operation is eventually done on the optical disc. Japanese Laid-Open Publications Nos. 2002-033997 and 2002-150683 both disclose such a technique of using a fixed storage medium in a recorder as a cache memory.

The alternating processing described above works if it is expected that some defects should be present on a given optical disc or while the optical disc drive is too busy with writing data on the optical disc to handle a new request. However, the alternating processing would not be quite effective should some abnormal event happen during the write operation (i.e., if an unexpected write error happens).

Such unexpected write errors typically happen due to tracking errors. The tracking errors are possibly caused due to (1) the presence of some defects on the surface of the given optical disc, (2) some externally applied shock or (3) the poor quality of the optical disc itself (e.g., having a significant degree of eccentricity or warpage).

Recently, demands for write-once optical discs such as DVD-R have been growing rapidly because such optical discs are relatively inexpensive. However, in those inexpensive write-once optical discs, the write errors tend to occur very frequently.

For example, if such a write error happens while a huge amount of data such broadcast cast is being written on an optical disc, then the amount of missing data will be much greater than the storage capacity of a normal alternate area on the optical disc. Accordingly, the conventional defect correcting processing cannot cope with such a big write error. Also, even if the alternate area has a sufficient capacity, it is still a problem that the optical disc drive cannot access the alternate area so frequently as not to miss any part of the data to be saved.

It should be noted that if the optical disc is used as mere backup storage (e.g., as an archive to save the information that has been copied from the hard disk), such problems rarely occur. In that situation, even if the optical disc drive needs to access the alternate area more times, it may take a longer time to complete the backup storage operation. Also, even if the write errors have occurred so frequently and the amount of errors exceeds the capacity of the prepared alternate area, you can insert a new disc and start the backup operation again since the original data is still left on the hard disk as it is.

However, those write errors will give serious effects on broadcast data being received by a TV set, for example, or audiovisual data (e.g., moving picture data and audio data) being captured by a camcorder while the data is being written on an optical disc in real time. These incoming video and audio signals are continuously supplied non-interactively. That is to say, it is impossible to control the operation of the data supplying or transmitting end (i.e., the master) according to the situations of the data receiving and storing end (i.e., the slave). In that case, if a write error occurs during a write operation, the real-time data such as the broadcast data stream will never wait until the alternate process is complete. Accordingly, any halt of the alternating process means missing some part of information to be saved.

It should be noted that most of these problems are avoidable if the broadcast or captured data is not directly saved on the optical disc but cached on the hard disk or a DRAM and then saved on the optical disc. In that case, however, even if the user wants to save the broadcast or captured data on the optical disc only, the data always needs to be written on both the optical disc and the hard disk. For that purpose, the two types of drives always need to be operated, which is not preferable in view of power saving consideration. The power saving is a particularly important problem for a battery-driven camcorder among other things.

Furthermore, it is not a practical measure to use a DRAM as an alternative cache memory for temporarily storing a huge amount of data such as broadcast data. This is because a DRAM has a relatively small storage capacity for its price.

SUMMARY OF THE INVENTION

In order to overcome the problems described above, preferred embodiments of the present invention provide a digital video recorder which can fully save the audiovisual data of a broadcast program being received or an image being captured without missing any part of it even if some abnormal event has occurred during the write operation.

A digital video recorder according to a preferred embodiment of the present invention is designed to write data on a selected one of a first storage medium and a second storage medium. The recorder preferably includes abnormal state detecting means for detecting an abnormal event that possibly occurs while the recorder is writing the data on the first storage medium. If the abnormal state detecting means senses the abnormal event while the recorder is writing the data on the first storage medium, then the recorder preferably stops writing the data on the first storage medium and preferably starts writing the data, which should have been written on the first storage medium only, on the second storage medium instead.

In one preferred embodiment of the present invention, when the abnormal state detecting means, having detected the abnormal event, further senses that the abnormal event has been resolved, the recorder preferably resumes writing the data on the first storage medium.

In another preferred embodiment, after having written the data, which should have been written on the first storage medium only, on the first and second storage media separately, the recorder may read out that portion of the data that has been written on the second storage medium and write the portion of the data on an unused area of the first storage medium.

In an alternative preferred embodiment, after having written the data, which should have been written on the first storage medium only, on the first and second storage media separately, the recorder may read out the data from the first and second storage media and write the data on a third storage medium.

In this particular preferred embodiment, the recorder preferably further includes means for switching the data being read out from the first storage medium into the data being read out from the second storage medium, or vice versa, instantaneously in accordance with management information on the second storage medium and address information derived from a read signal.

In still another preferred embodiment, the first storage medium may be an optical disc and the second storage medium may be a hard disk or a semiconductor memory.

In yet another preferred embodiment, the first and third storage media may be optical discs and the second storage medium may be a hard disk or a semiconductor memory.

In a specific preferred embodiment, the abnormal state detecting means may detect the abnormal event in accordance with a tracking error signal to be obtained while a tracking operation is being carried out on the optical disc.

In an alternative preferred embodiment, the abnormal state detecting means may detect the abnormal event in accordance with a read signal obtained from the optical disc.

In yet another preferred embodiment, the first storage medium may be removable and the second storage medium may be fixed.

In yet another preferred embodiment, the data to be written on the first storage medium may be broadcast data.

In this particular preferred embodiment, the recorder preferably further includes a tuner for receiving the broadcast data.

In yet another preferred embodiment, the recorder may further include an imager, and the data to be written on the first storage medium may be the output of the imager.

In yet another preferred embodiment, the recorder preferably writes the data, which has been written on the first storage medium, on the second storage medium after a predetermined amount of delay.

In yet another preferred embodiment, the recorder may further include a dummy data generator for writing dummy data on the first storage medium while the recorder is writing the data on the second storage medium.

In yet another preferred embodiment, identification information, which is uniquely associated with at least a portion of the data on the first storage medium, is preferably added to the data being written on the second storage medium.

In yet another preferred embodiment, the logical addresses of the data to be written on the second storage medium are continuous with the logical addresses of the data that has been written on the first storage medium.

A digital video recorder driving method according to a preferred embodiment of the present invention is a method of driving a digital video recorder which can write data on a selected one of a first storage medium and a second storage medium. The method preferably includes the steps of: detecting abnormal event that has occurred while the recorder is writing the data on the first storage medium; and stopping writing the data on the first storage medium and starting writing the data, which should have been written on the first storage medium only, on the second storage medium on detecting the abnormal event.

A program according to a preferred embodiment of the present invention is to be installed in a microprocessor for a digital video recorder which can write data on a selected one of a first storage medium and a second storage medium. The program is preferably defined so as to make the microprocessor perform the steps of: detecting an abnormal event that has occurred while the recorder is writing the data on the first storage medium; and stopping writing the data on the first storage medium and starting writing the data, which should have been written on the first storage medium only, on the second storage medium on detecting the abnormal event.

According to various preferred embodiments of the present invention described above, even if some abnormal event has occurred while the audiovisual data of a broadcast program being received or an image being captured is being written on a storage medium such as an optical disc, the audiovisual data can still be saved fully without missing any part of it.

Other features, elements, processes, steps, characteristics and advantages of the present invention will become more apparent from the following detailed description of preferred embodiments of the present invention with reference to the attached drawings.

Figure 1:
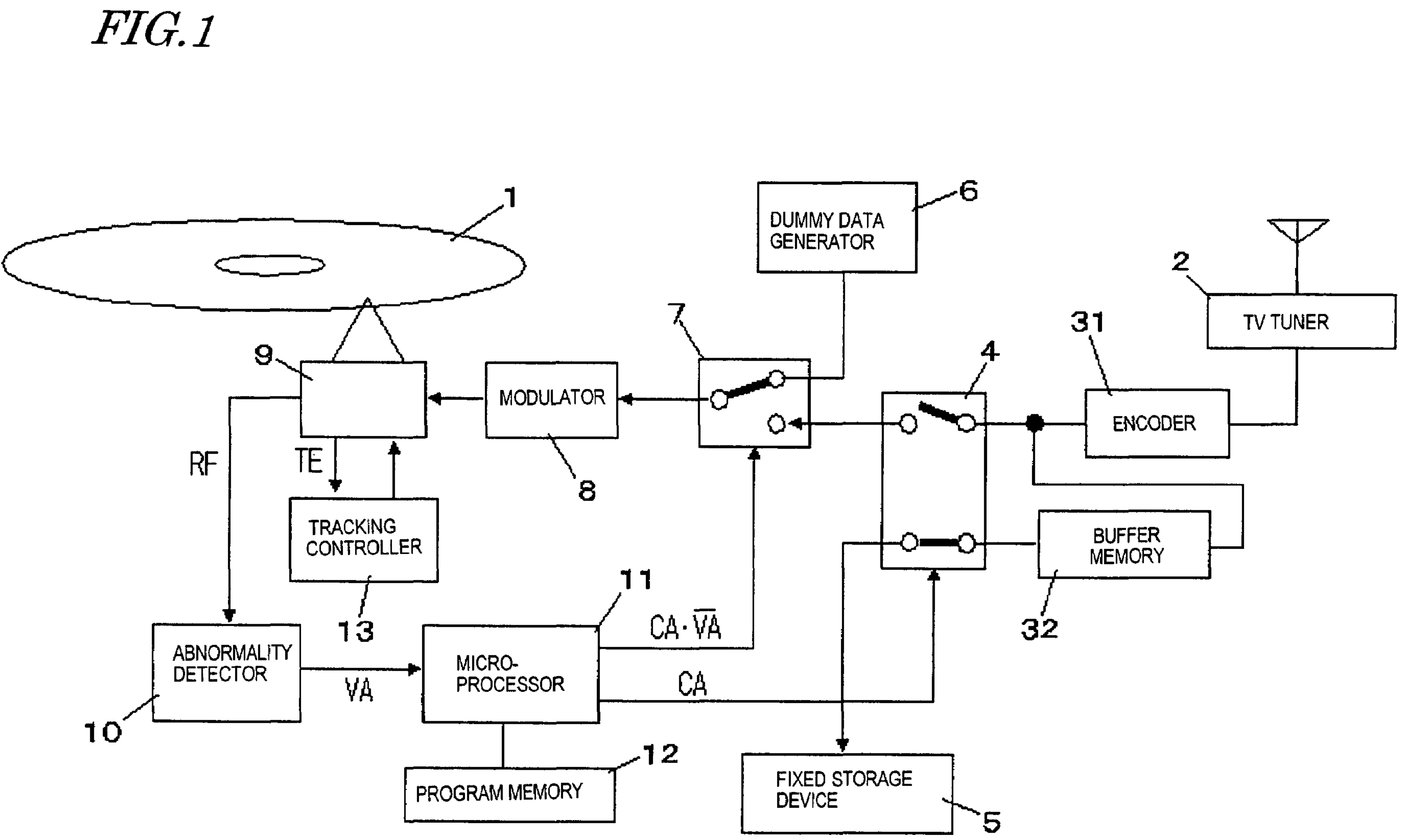
FIG. 1 is a block diagram showing a digital video recorder according to a first specific preferred embodiment of the present invention.
Figure 2:
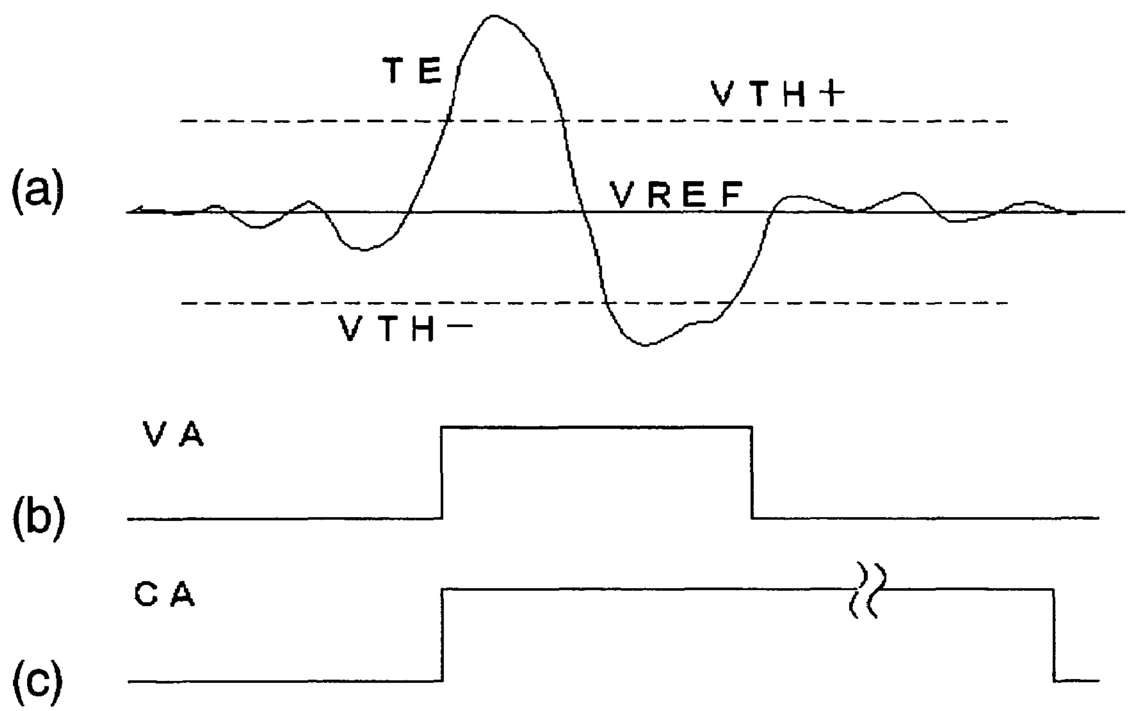

Portion (a) of FIG. 2 shows the waveform of a tracking error TE, portion (b) of FIG. 2 shows the waveform of a detection signal VA which is the output signal of the abnormal state detector of the digital video recorder shown in FIG. 1, and portion (c) of FIG. 2 shows the waveform of a control signal CA which is output in response to the detection signal VA.

Figure 3:
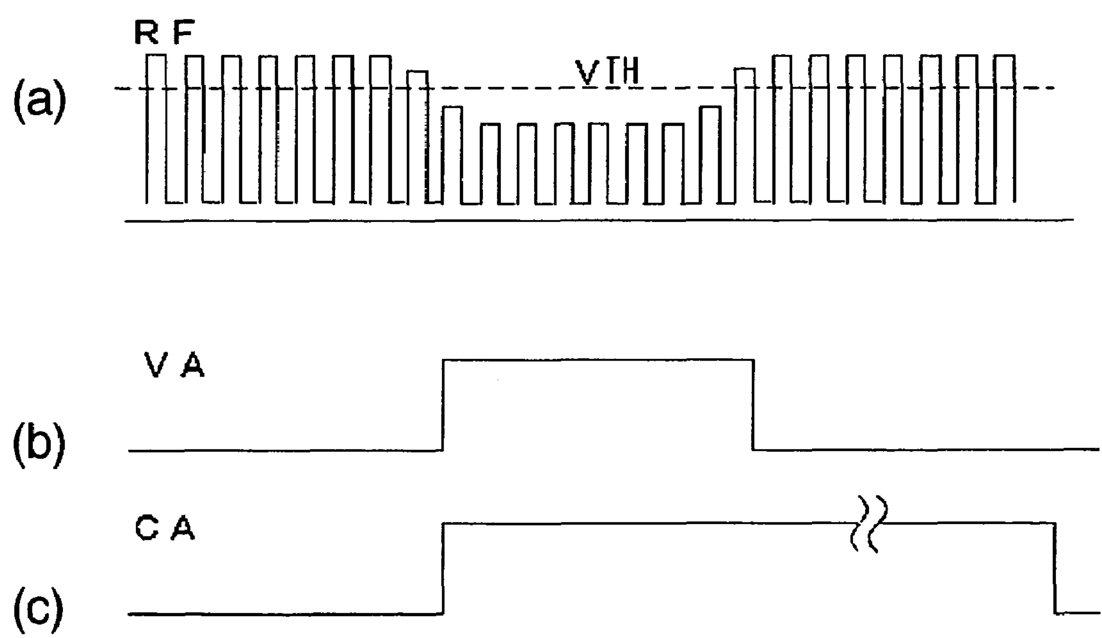

Portion (a) of FIG. 3 shows the waveform of a read signal RF, portion (b) of FIG. 3 shows the waveform of a detection signal VA which is the output signal of the abnormal state detector of the digital video recorder shown in FIG. 1, and portion (c) of FIG. 3 shows the waveform of a control signal CA which is output in response to the detection signal VA.

Figure 4:
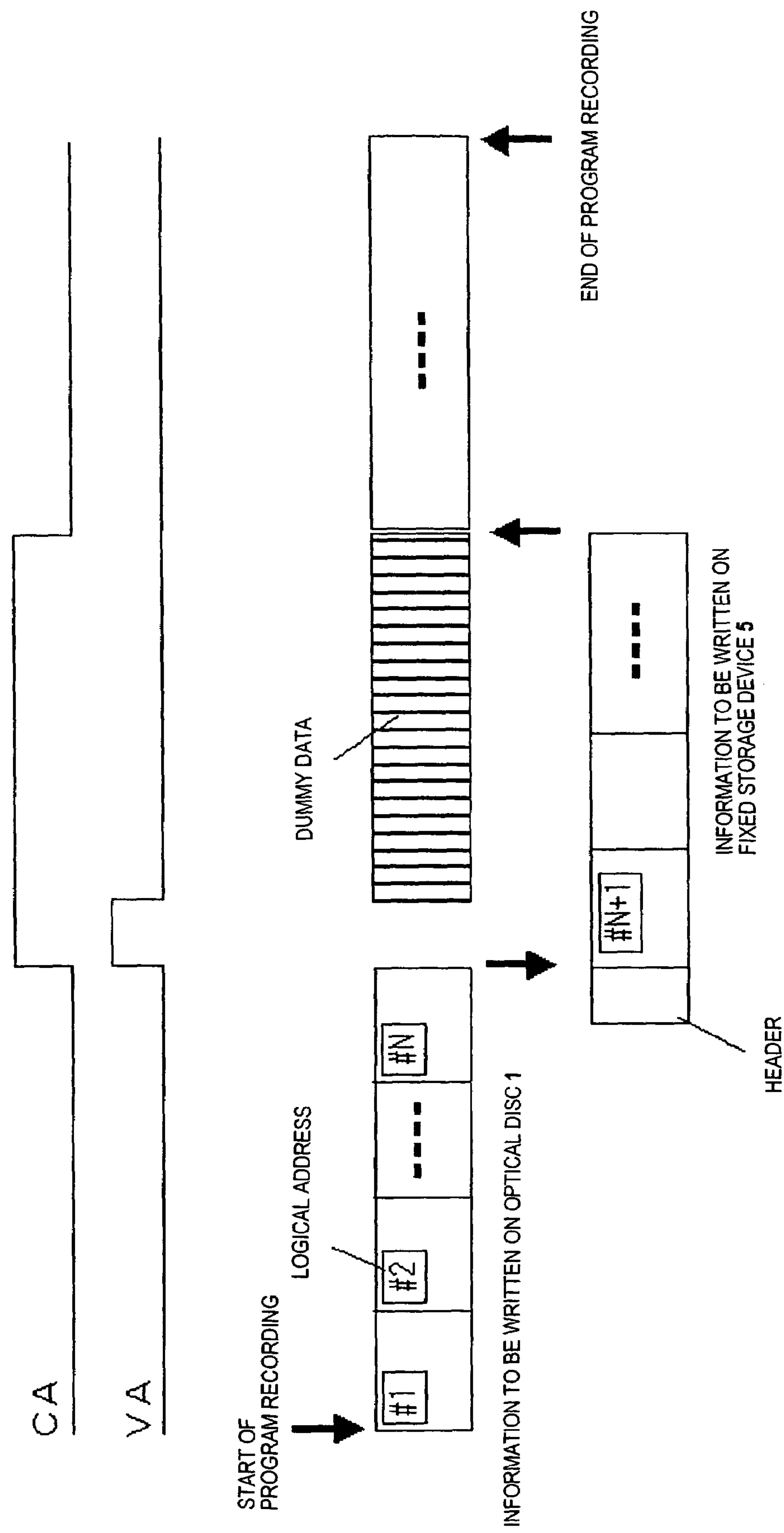

FIG. 4 shows how dummy data is written.

Figure 5:
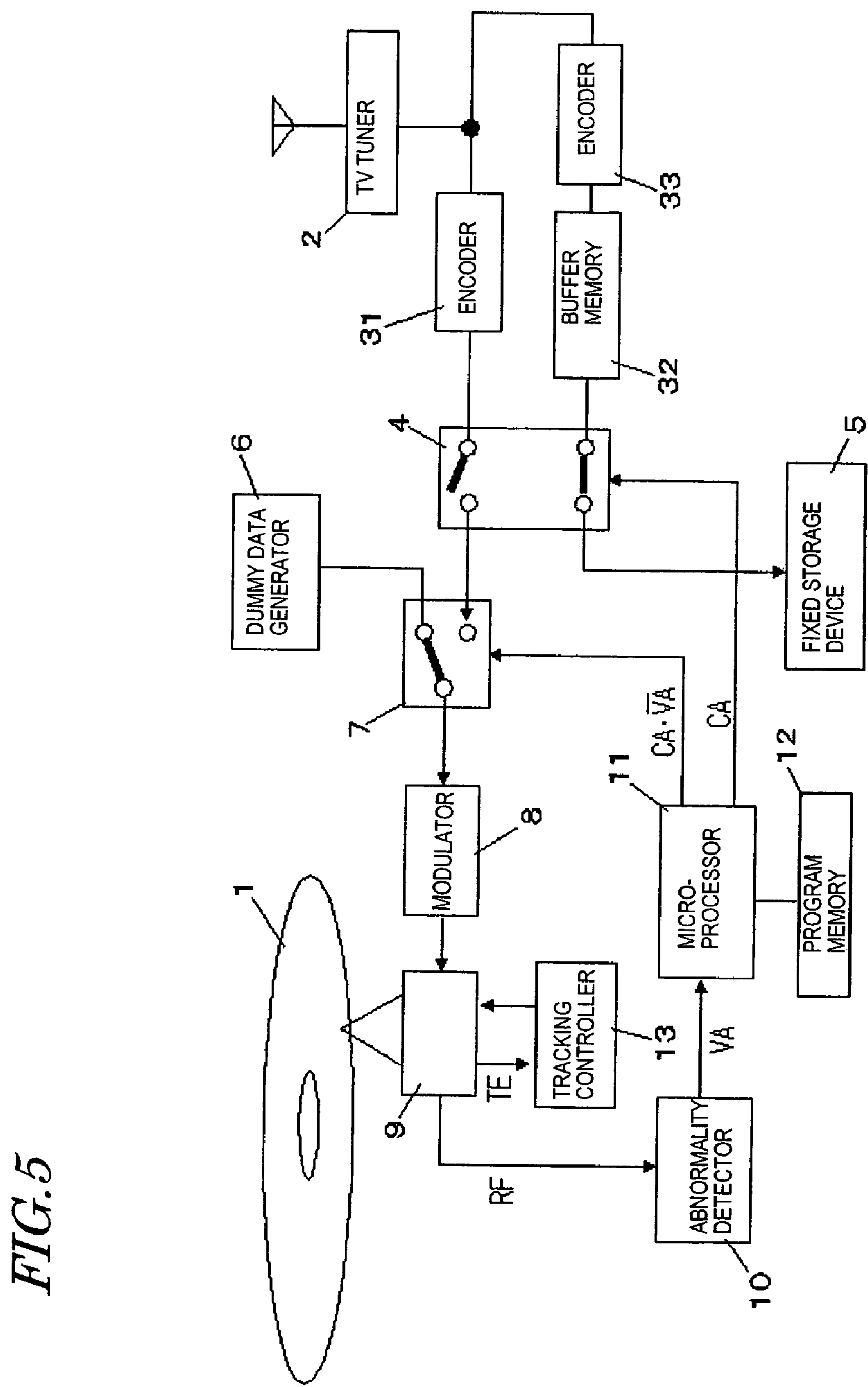

FIG. 5 is a block diagram showing a digital video recorder according to a second specific preferred embodiment of the present invention.

Figure 6:
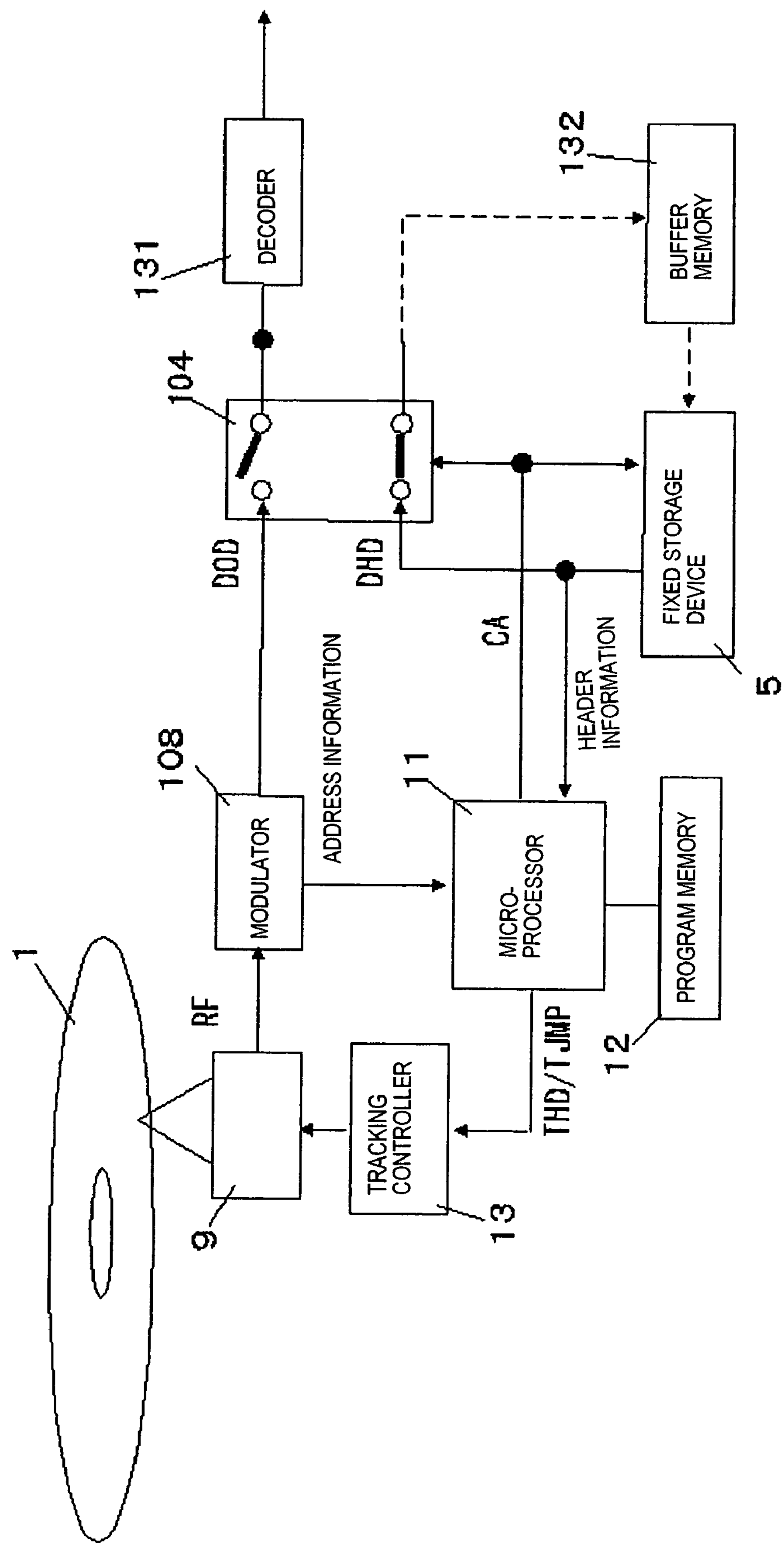

FIG. 6 is a block diagram showing a digital video recorder according to a third specific preferred embodiment of the present invention.

Figure 7:
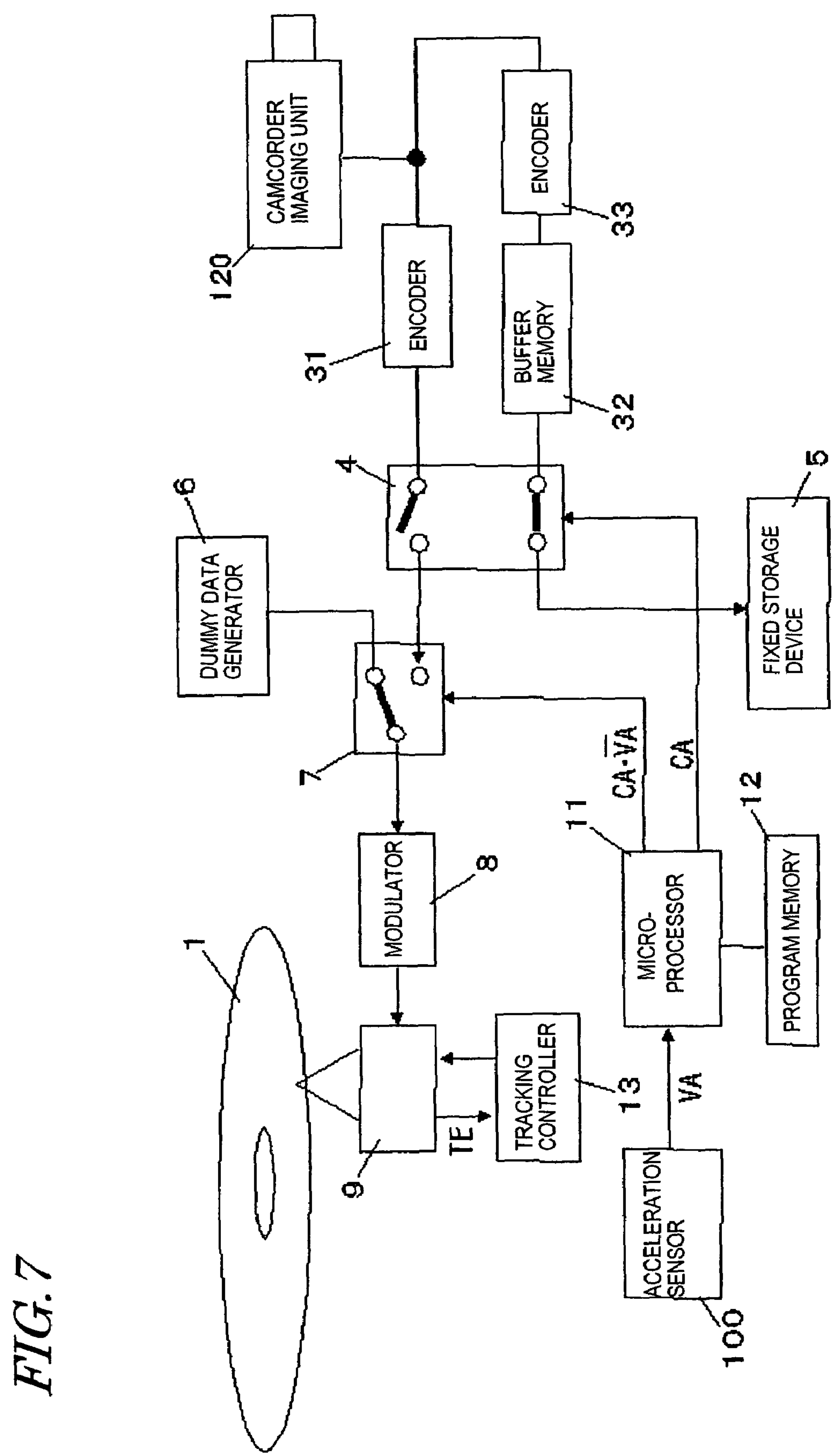

FIG. 7 is a block diagram showing a digital video recorder according to a fourth specific preferred embodiment of the present invention.

DETAILED DESCRIPTION OF PREFERRED EMBODIMENTS

Hereinafter, preferred embodiments of the present invention will be described.

Embodiment 1

A digital video recorder according to a first specific preferred embodiment of the present invention will be described with reference to the accompanying drawings.

A digital video recorder according to this preferred embodiment can selectively write digital data either on an optical disc 1 or on a fixed storage device 5. The optical disc 1 is an exchangeable, i.e., may be removed from this digital video recorder and exchanged for another optical disc 1 at any time. On the other hand, the fixed storage device 5 is fixed to this digital video recorder.

In FIG. 1, components for performing a write operation on the optical disc 1 are shown in detail as a block diagram, while components for performing a write operation on the fixed storage device 5 are included in the same block named the "fixed storage device 5". Accordingly, this block 5 includes not just a storage medium but also a drive with mechanisms and circuits for reading and writing. However, the configuration and operation of the fixed storage device 5 are known ones, and the detailed description thereof will be omitted herein.

The digital video recorder of this preferred embodiment includes an optical head 9, which irradiates the optical disc 1, loaded into the optical disc drive of this digital video recorder, with a laser beam. The configuration of the optical disc drive including the optical head 9 is the same as the known one.

The optical head 9 preferably includes a semiconductor laser diode functioning as a light source for emitting the laser beam, an objective lens for focusing the laser beam onto the optical disc and thereby forming a beam spot on the optical disc, an actuator for driving the objective lens, and a photodetector for receiving the laser beam that has been reflected from the optical disc 1 and converting an optical signal into an electric signal.

In the example illustrated in FIG. 1, the output read signal RF and tracking error signal TE of the optical head 9 are supplied to an abnormal state detector 10 and a tracking controller 13, respectively. The tracking controller 13 controls the operation of the optical head 9 such that the focal point of the laser beam is always located on the desired track just as intended. The abnormal state detector 10 can detect abnormal events occurring while data is being written on the optical disc 1.

The functions of a signal processor for processing an electric signal that has been received from the optical head 9 may be implemented by an LSI such as a DSP. When such an LSI is used, the abnormal state detector 10 and tracking controller 13 are not provided as individual analog circuits but as functional blocks executing a digital signal processing software program.

The digital video recorder of this preferred embodiment preferably further includes an encoder 31 for encoding the broadcast data, which has been received by a TV tuner 2, into an MPEG 2 stream, for example. The data (or data stream) that has been encoded by the encoder 31 is selectively stored either on the optical disc 1 or on the fixed storage device 5.

In this preferred embodiment, the TV tuner 2 preferably receives an analog broadcast radio wave. However, the present invention is in no way limited to this particular preferred embodiment. Accordingly, the TV tuner may also receive a digital broadcast radio wave. If the TV tuner 2 can receive a digital broadcast and can output encoded data (or data stream) such as an MPEG 2 stream, then the encoder 31 shown in FIG. 1 may be omitted. It should be noted that the TV tuner 2 may be provided either outside or inside of the digital video recorder.

If this digital video recorder should directly write the received broadcast data on the optical disc 1, then the data stream is passed to a modulator 8 by way of two selectors 4 and 7. In response, the modulator 8 converts the received data stream into a write signal (e.g., (1, 7) PWM signal) that is compatible with the storage medium selected.

The operations of the selectors 4 and 7 are controlled by a microprocessor 11. The program to be executed by the microprocessor 11 is stored on a program memory 12. The output data of the modulator 8 is written by the optical head 9 on the optical disc 1.

As soon as the abnormal state detector 10 detects any abnormal events while data is being written on the optical disc 1, the microprocessor 11 operates so as to stop transferring the data to the optical disc 1 and start transferring it to the fixed storage device 5 instead.

Hereinafter, an exemplary method for detecting an abnormal event during a data writing operation will be described with reference to FIG. 2.

Portion (a) of FIG. 2 shows the waveform of the tracking error signal TE that is output from the optical head 9. The tracking error signal TE is a signal representing the shift of the beam spot of the laser beam from the center of the information track on the optical disc. When there is no such beam shift, the potential level of the tracking error signal TE is substantially equal to that of the reference potential VREF.

In accordance with this tracking error signal TE, the tracking controller 13 carries out the process of controlling the position of the beam spot. More specifically, the tracking controller 13 drives the actuator in the optical head 9 such that the level of the tracking error signal TE is always equal to that of the reference potential VREF. As a result, while the optical disc 1 is rotating at a high velocity, the beam spot on the optical disc 1 can always follow the center of the desired information track.

If an "abnormal tracking dislocation" happens for any reason while data is being written on, or read out from, the optical disc, then the tracking control will be no longer effective. In that situation, the level of the tracking error signal TE will be either higher than the upper threshold VTH+ or lower than the lower threshold VTH− as shown in portion (a) of FIG. 2. Accordingly, the abnormal state detector 10 compares the level of the tracking error signal TE with the upper threshold VTH+ and lower threshold VTH−, and if the level of the tracking error signal TE is outside of the allowable range that is defined by the upper and lower thresholds VTH+ and VTH−, the abnormal state detector 10 outputs the detection signal VA shown in portion (b) of FIG. 2 to the microprocessor 11. While tracking errors are within an allowable level, the detection signal VA shows the "Low" level. However, once the level of the tracking error signal TE has fallen out of the allowable range defined by the upper and lower thresholds VTH+ and VTH−, the detection signal VA changes from the "Low" level into the "High" level.

In response to the detection signal VA, the microprocessor 11 generates the control signal CA for changing a transfer path shown in portion (c) of FIG. 2. The leading edge of the control signal CA (i.e., the timing at which the signal CA rises from the "Low" level to the "High" level) is determined by the rise of the detection signal VA but the trailing edge thereof is determined by the microprocessor 11. The control signal CA will fall to the "Low" level either selectively when no pulses of the detection signal VA are generated within a unit time period or automatically when a predetermined amount of time (e.g., 10 seconds) has passed since the last leading edge of the detection signal VA As another alternative, if the fixed storage device 5 has plenty of available capacity, then the control signal CA may also be continuously supplied until the broadcast program ends.

Next, another exemplary method for detecting an abnormal event during a data writing operation will be described with reference to FIG. 3.

Portion (a) of FIG. 3 shows the waveform of the read signal RF corresponding to the light that has been reflected from the optical disc 1. If the focal point becomes uncontrollable due to some disturbance in the focus direction, for example, the upper envelope of the read signal RF shrinks as shown in portion (a) of FIG. 3. The abnormal event occurring while data is being written on the optical disc 1 may also be detected by the decreased upper envelope amplitude of the read signal RF. When the upper envelope of the read signal RF becomes lower than a predetermined level, the abnormal state detector 10 outputs the detection signal VA shown in portion (b) of FIG. 3 to the microprocessor 11. In response to this detection signal VA, the control signal CA shown in portion (c) of FIG. 3 appears on the output. More specifically, when the control signal CA rises from the "Low" level to the "High" level, the selector 4 switches the transmission paths. That is to say, the transmission line for transferring information from the encoder 31 to the optical disc 1 is closed, but the transmission line leading to the fixed storage device 5 is opened instead.

In this preferred embodiment, a buffer memory 32 is provided for the purpose of delaying the output data of the encoder 31 shown in FIG. 1 for a predetermined amount of time. Accordingly, when the control signal CA has the "High" level, the output data of this buffer memory 32 is supplied to the fixed storage device 5 by way of the selector 4.

When the abnormal state detector 10 is turned ON, it is highly likely that a write error has already occurred during the data writing operation. In other words, if the encoder 31 starts sending data to the fixed storage device 5 in response to the control signal CA without using any buffer memory 32, a part of the information to be stored may be already missing. For that reason, in this preferred embodiment, the same data as the missing data that is temporarily stored in the buffer memory 32 is transferred to the fixed storage device 5, thereby avoiding the unwanted situation where part of the information to be stored is missing.

In the digital video recorder of this preferred embodiment, the various types of processing described above is carried out in accordance with the program stored in the program memory 12 for the microprocessor 11. As a result of these processes, the data that has been received by the TV tuner 2 is selectively supplied to, and written on, either the optical disc 1 or the fixed storage device 5 in accordance with the control signal CA.

FIG. 4 schematically shows how to switch the storage media in accordance with the detection signal VA and control signal CA.

When the broadcast data of a program being received starts being written on the optical disc 1, the data specified by logical address #1 starts being written on the optical disc 1. Suppose a write error is detected after the data specified by logical addresses #1 through #N has been written on the optical disc 1 and while the data specified by logical address #N+1 is being written thereon. In that case, the remaining data specified by the logical address #N+1 and the data specified by succeeding addresses are written on the fixed storage device 5.

Identification information, which is uniquely associated with at least part of the information on the optical disc 1, is added to the data being supplied to the fixed storage device 5 (i.e., the data specified by the logical address #N+1 and so on). This identification information allows for determining exactly where the data on the fixed storage device 5 should have been written on the optical disc 1. Also, by adding such identification information, even if errors have been detected several times and if the data has been temporarily written on the fixed storage device 5 each time, the written data can be read out from the fixed storage device 5 just as intended.

The identification information may have logical addresses (i.e., #N+1 and so on in the example shown in FIG. 4) that are continuous to the logical addresses (i.e., #1 through #N in FIG. 4) added to the information on the optical disc 1. If the fixed storage device 5 is used for other purposes (e.g., to write the broadcast data of a received program normally), then the data to be temporarily written on the fixed storage device 5, when the abnormal event occurs while the data is being written on the optical disc, preferably has some identifier showing its identity as a temporary data file. For that purpose, a header including management information that represents the type of the file is preferably added to the data. The addresses and headers described above are added by the encoder 31.

In this preferred embodiment, while the level of the control signal CA is High (i.e., while the abnormal state has not been resolved yet), dummy data are written on the optical disc 1 as shown in FIG. 4. The dummy data may be random number data, for example, and may be generated by the dummy data generator 6 shown in FIG. 1. The output dummy data of the dummy data generator 6 is supplied to, and written on, the optical disc 1 by way of the selector 7 shown in FIG. 1.

A main object of the present invention is to avoid the unwanted situation where part of the broadcast program data to be saved fully is missing due to a tracking accident that has been caused by scratches on the optical disc or some vibration or disturbance. Accordingly, in most cases to be handled by the present invention, the optical disc itself has no problems at all or just some minor problems. In that case, if absolutely no data was written on the optical disc 1 while the data is being written on the fixed storage device 5, then unrecorded tracks will be left, thereby making the optical disc 1 partially blank.

In an optical disc of which the data storage layer is made of a phase change material, the difference in reflectance between recorded tracks and unrecorded tracks is relatively small. On the other hand, in a write-once optical disc of which the data storage layer is made of a dye based material, the difference in reflectance is significant. Furthermore, in a so-called dual-layer optical disc in which one of the two layers just passes the incoming light but the data is read from, or written on, the other layer, if those unrecorded areas are present here and there, then the servo operation often loses its stability to possibly cause some variations in laser power while the data is being written on the other layer. To overcome these problems, according to this preferred embodiment, even if the level of the control signal CA is High, the dummy data is also written on the optical disc as shown in FIG. 4 as long as the optical disc 1 is a data writable state (i.e., when the detection signal VA is low).

Thus, according to the preferred embodiment described above, even if the operation of writing the received broadcast data on the optical disc 1 is seriously affected by a tracking error that has been caused due to scratches on the optical disc or some vibration or disturbance, the broadcast data can still be saved fully without missing any part of it by using the fixed storage device 5 as an auxiliary storage.

In the preferred embodiment described above, if any abnormal events occur while the data are written on the optical disc 1, then the target storage medium on which the data should be written is switched from the optical disc (i.e., the first storage medium) into the fixed storage device (i.e., the second storage medium), thereby temporarily writing the data on the second storage medium. However, the second storage medium of the present invention does not have to be such a fixed one but may also be an exchangeable one. For example, the second storage medium may also be a card hard disk drive or a semiconductor memory (or memory card) to be inserted into a PCMCIA throttle.

Embodiment 2

Hereinafter, a digital video recorder according to a second specific preferred embodiment of the present invention will be described with reference to FIG. 5.

Unlike the digital video recorder of the first preferred embodiment described above, the digital video recorder of this second preferred embodiment further includes another encoder 33 between the TV tuner 2 and the buffer memory 32 and uses a semiconductor memory as the fixed storage device 5.

Generally speaking, the bit price of a semiconductor memory is normally much more expensive than that of a hard disk. For that reason, it is not preferable to use a semiconductor memory having as large storage capacity as a hard disk because the price of digital video recorders will rise unintentionally. Nevertheless, if a semiconductor memory having relatively small storage capacity (e.g., an SRAM with a storage capacity of 64 MB) is used as the fixed storage device 5, a standard (SD) MPEG 2 moving picture can be recorded on the fixed storage device 5 for only about 1.5 minutes. In that case, if some abnormal event occurs and lasts for 1.5 minutes or more while data is being written on an optical disc, then the amount of data to be written on the fixed storage device 5 will exceed the storage capacity of the fixed storage device 5. As a result, part of the information to be saved should be missing, which is a problem that should not be ignored.

Thus, to overcome such a problem, in this preferred embodiment, the data that is going to be written on the fixed storage device 5 is encoded in advance by the encoder 33 so as to be compressed (i.e., have a decreased amount of data) as shown in FIG. 5. Then, a semiconductor memory with a relatively small storage capacity may also be used as the fixed storage device 5.

More specifically, if the information that has been received at the TV tuner 2 is moving picture or audio data, then the encoder 33 generates a stream of video or audio data to be transferred at a decreased rate. When the encoder 33 is allowed to carry out such compression, the quality of the video or audio data must be sacrificed to a certain degree. However, video or audio data of longer duration can be stored on the fixed storage device 5, thus making it easier to avoid such partial loss of necessary information. The transfer rate can be reduced by decreasing either the number of pixels or the number of moving pictures per second.

Embodiment 3

Hereinafter, a digital video recorder according to a third specific preferred embodiment of the present invention will be described with reference to FIG. 6.

The digital video recorder of this preferred embodiment preferably includes a demodulator 108 and a decoder 131, which are necessary to read data from the optical disc 1. As described above, the photodetector included in the optical head 9 receives a laser beam that has been reflected from the optical disc 1, thereby generating a read signal RF representing the intensity of the laser beam received and outputting the signal RF to the demodulator 108. From the read signal RF, the demodulator 108 generates address information representing the location of the laser beam spot on the optical disc 1.

Although not shown in FIG. 6, the digital video recorder of this preferred embodiment, as well as the counterpart of the first or second preferred embodiment described above, preferably includes the encoder 31 and modulator 8.

In starting a read operation, the digital video recorder of this preferred embodiment accesses the fixed storage device 5 to read the headers of the files that are stored on the fixed storage device 5. By checking the contents of these file headers, the digital video recorder can determine whether or not any write error has occurred during writing data on the optical disc 1.

The digital video recorder of this preferred embodiment can locate the missing part of information on the optical disc 1 by the logical address #N+1 of the header of each file on the fixed storage device 5. Accordingly, on and after the logical address #N+1 is reached while the digital video recorder is reading information from the optical disc 1, the digital video recorder accesses the fixed storage device 5 to read data from the fixed storage device 5 instead.

Hereinafter, it will be described in further detail how the digital video recorder of this preferred embodiment reads the data that has been written on the optical disc 1 and fixed storage device 5 separately.

In the digital video recorder of this preferred embodiment, the microprocessor 11 always monitors the address information obtained by the demodulator 108. The microprocessor 11 receives the header information from the fixed storage device 5. When the address obtained by the demodulator 108 reaches #N, the microprocessor 11 once stops reading data from the optical disc 1. The data reading operation may be suspended by making the microprocessor 11 send a tracking hold signal THD to a tracking controller 13 such that the data access to the address #N is inhibited.

While stopping reading the data from the optical disc 1, the microprocessor 11 also generates a switching signal CA and supplies it to the selector 104, thereby turning the selector 104 such that not the signal DOD that has been read and demodulated from the optical disc 1 but a signal DHD that has been read out from the fixed storage device 5 is supplied to the decoder 131.

The signal DHD includes file information that starts with the address #N+1. Accordingly, no matter where the information has come from, the decoder 131 can always obtain information with consecutive addresses. Consequently, the video information can be read out seamlessly.

The header of each file to be stored on the fixed storage device 5 preferably includes the volume label of the optical disc 1 on which a write error has occurred. Then, such an optical disc with the write error can be identified by the volume label. Also, even if the user loads his or her arbitrarily selected one of multiple optical discs into this digital video recorder to read data therefrom, the data can also be appropriately read out from the fixed storage device 5 if necessary.

Next, it will be described how to resume reading the data from the optical disc 1 after having read the data from the fixed storage device 5. In that case, the microprocessor 11 sends a track jump instruction TJMP to the tracking controller 13 such that the head location is shifted to the end of the area where the dummy data is written as shown in FIG. 4.

Optionally, the reconstructed information may be written again as a completely repaired file either on the optical disc 1 or on the fixed storage device 5. As indicated by the dashed line in FIG. 6, the seamless repaired data, which has been output from the selector 104, may be temporarily stored on the buffer memory 132 and then written on the fixed storage device 5. Then, a complete file may be saved on the fixed storage device 5. If the optical disc 1 still has any capacity available, then the output of the buffer memory 132 may be written on the optical disc 1 by the modulator 8 (not shown in FIG. 6 but in FIG. 1).

Embodiment 4

Hereinafter, a digital video recorder according to a fourth specific preferred embodiment of the present invention will be described with reference to FIG. 7. It should be noted that the "digital video recorder" refers herein to any apparatus having ability to write some moving picture or audio data on any storage medium. Accordingly, the "digital video recorder" is not limited to a fixed digital video recorder for use to write broadcast data but may broadly refer to a camcorder, a personal digital assistant or any other mobile electronic appliance.

Unlike the digital video recorder shown in FIG. 5, the digital video recorder of this preferred embodiment includes a camcorder imaging unit 120 as an alternative video signal supply source instead of the TV tuner 2 and further includes an acceleration sensor 100 for detecting any abnormal event that may occur while data is being written on the optical disc 1.

The camcorder imaging unit 120 may have any known configuration and may include a camera optical system and a CCD imager, for example. A video signal supplied from the camcorder imaging unit 120 during the image capturing operation is a non-interactive one as in the broadcast data of a TV program received. Accordingly, the supply of the video signal may not be stopped even if the receiving end (i.e., the slave) is not ready to receive it.

According to this preferred embodiment, any abnormal event that may occur while the data captured is being written on the optical disc 1 can be detected. And when such abnormal state is sensed, part of the data may be temporarily written and stored on the fixed storage device 5. Then, the video-recorded data can be saved fully without missing any part of it.

A camcorder is often operated while being carried about. Accordingly, a major tracking dislocation occurring at the optical head of a camcorder is caused by the vibration or shock that is directly applied to the camcorder itself. For that reason, according to this preferred embodiment, those write errors are detected by using the acceleration sensor 100.

The acceleration sensor 100 may be a normal sensor that operates either by monitoring the motion of a very small pendulum or by detecting the electromotive force to be produced by a piezoelectric element under vibration. Alternatively, the acceleration sensor 100 may also sense any abnormal acceleration by detecting variations in the focus error signal or tracking error signal to be generated by the optical head 9.

On sensing that the level of a detection signal VA, representing the acceleration that has been detected by the acceleration sensor 100, has exceeded a predetermined threshold value, the microprocessor 11 changes the destination of the video signal supplied from the camcorder imaging unit 120 from the optical disc 1 into the fixed storage device 5, thereby temporarily writing and storing the data on the fixed storage device 5. As a result, even when the camcorder is subject to some vibration or shock, the captured data can be fully saved on the storage media without missing any part of it.

The present invention is applicable for use in various types of digital video recorders including a digital video recorder for recording a received broadcast program on an optical disc, for example, and a camcorder for writing a captured moving picture and audio data on an optical disc, for example.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2003-007181 filed Jan. 15, 2003, and No. 2004-002618 filed Jan. 8, 2004, the entire contents of which are hereby incorporated by reference.

What is claimed is:

1. A digital video recorder for writing data on a selected one of a first storage medium and a second storage medium, the recorder comprising abnormal state detecting means for detecting an abnormal event that unexpectedly occurs while the recorder is writing the data on the first storage medium, wherein the abnormal state detecting means senses a tracking abnormality from a tracking error signal amplitude, while a tracking operation is being carried out on the first storage medium, and if the abnormal state detecting means senses the abnormal event while the recorder is writing the data on the first storage medium, then the recorder stops writing the data on the first storage medium and starts writing the data, which should have been written on the first storage medium only, on the second storage medium instead.

2. The recorder of claim 1, wherein when the abnormal state detecting means, having detected the abnormal event, further senses that the abnormal event has been resolved, the recorder resumes writing the data on the first storage medium.

3. The recorder of claim 1, wherein after having written the data, which should have been written on the first storage medium only, on the first and second storage media separately, the recorder reads out that portion of the data that has been written on the second storage medium and writes the portion of the data on an unused area of the first storage medium.

4. The recorder of claim 1, wherein after having written the data, which should have been written on the first storage medium only, on the first and second storage media separately, the recorder reads out the data from the first and second storage media and writes the data on a third storage medium.

5. The recorder of claim 4, further comprising means for switching the data being read out from the first storage medium into the data being read out from the second storage medium, or vice versa, instantaneously in accordance with management information on the second storage medium and address information derived from a read signal.

6. The recorder of claim 1, wherein the first storage medium is an optical disc, and wherein the second storage medium is a hard disk or a semiconductor memory.

7. The recorder of claim 6, wherein the abnormal state detecting means senses a state that a read signal obtained from the first storage medium is not normal as the abnormal event.

8. The recorder of claim 1, wherein the first and third storage media are optical discs, and wherein the second storage medium is a hard disk or a semiconductor memory.

9. The recorder of claim 1, wherein the first storage medium is removable, and wherein the second storage medium is fixed.

10. The recorder of claim 1, wherein the data to be written on the first storage medium is broadcast data.

11. The recorder of claim 10, further comprising a tuner for receiving the broadcast data.

12. The recorder of claim 1, further comprising an imager, wherein the data to be written on the first storage medium is the output of the imager.

13. The recorder of claim 1, wherein the recorder writes the data, which has been written on the first storage medium, on the second storage medium after a predetermined amount of delay.

14. The recorder of claim 1, further comprising a dummy data generator for writing dummy data on the first storage medium while the recorder is writing the data on the second storage medium.

15. The recorder of claim 1, wherein identification information, which is uniquely associated with at least a portion of the data on the first storage medium, is added to the data being written on the second storage medium.

16. The recorder of claim 15, wherein the logical addresses of the data to be written on the second storage medium are continuous with the logical addresses of the data that has been written on the first storage medium.

17. The recorder of claim 1, wherein the abnormal state detecting means senses a state that an acceleration of the recorder exceeds a predetermined threshold value as the abnormal event.

18. A method of driving a digital video recorder, the digital video recorder being able to write data on a selected one of a first storage medium and a second storage medium, the method comprising the steps of:

detecting an abnormal event that has unexpectedly occurred while the recorder is writing the data on the first storage medium;

sensing a tracking abnormality from a tracking error signal amplitude while a tracking operation is being carried out on the first storage medium; and stopping writing the data on the first storage medium and starting writing the data, which should have been written on the first storage medium only, on the second storage medium on detecting the abnormal event.

19. A computer program embodied in a computer readable media, the program to be installed in a microprocessor for a digital video recorder, the digital video recorder being able to write data on a selected one of a first storage medium and a second storage medium, the program being defined so as to make the microprocessor perform the steps of:

detecting an abnormal event that has unexpectedly occurred while the recorder is writing the data on the first storage medium;

sensing a tracking abnormality from a tracking error signal amplitude while a tracking operation is being carried out on the first storage medium; and stopping writing the data on the first storage medium and starting writing the data, which should have been written on the first storage medium only, on the second storage medium on detecting the abnormal event.

* * * * *